United States Patent Office 3,455,906
Patented July 15, 1969

3,455,906
7α,8-EPOXYESTRA-1,3,5(10)TRIENE-3,17-DIOLS
David J. Marshall, Montreal, Quebec, and Yvon Lefebvre, Pierrefonds, Quebec, Canada, assignors to American Home Products Corporation, New York, N.Y., a corporation of Delaware
No Drawing. Filed Feb. 14, 1967, Ser. No. 615,887
Int. Cl. C07c 173/00
U.S. Cl. 260—239.55                                28 Claims

ABSTRACT OF THE DISCLOSURE

There are disclosed herein the 17α-lower alkyl, 17α-lower-alkenyl, 17α-lower alkinyl, 17α-2'- and 3'-furyl, and 17α-2'- and 3'-thienyl derivatives of 7α,8-epoxyestra-1,3,5(10)-triene-3,17-diol, as well as their 17-acetates, 17-propionates, and 17-butyrates, their 3-(lower alkyl), 3-(lower cycloalkyl), and 3-tetrahydropyranyl ethers, and their 3-acetate, 3-propionate, 3-butyrate, 3-benzoate, 3-succinate, 3-hexahydrobenzoate, 3-cyclopentylpropionate, and 3-sulfate esters, the latter in the form of their salts with alkali metals or organic bases.

The compounds of this invention are useful as implantation inhibitors, and a process for their preparation as well as methods for their formulation and use are also given.

The present invention relates to 17-substituted derivatives of 7α,8-epoxyestra-1,3,5(10)-triene-3,17-diols (and to the processes whereby the described compounds are prepared).

These new compounds are represented by the following general Formula I:

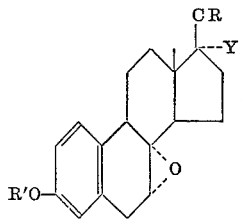

I in which R represents hydrogen or a lower aliphatic acyl group, such as, for example, the acetyl, propionyl, or butyryl groups, R' represents hydrogen, a lower alkyl group containing 1–8 carbon atoms, a cycloalkyl group containing from 5–7 carbon atoms, the tetrahydropyranyl group, or an acyl group, such as, for example, acetate, propionate, butyrate, benzoate, succinate, hexahydrobenzoate, cyclopentylpropionate or

X+SO₃— in which X+ represents a cation such as, sodium, potassium or an organic base, and Y represents a lower alkyl group containing from 1–4 carbon atoms, a lower alkenyl group containing 2–4 carbon atoms, a lower alkinyl group containing 2–4 carbon atoms, a 2'-furyl group, a 3'-furyl group, a 2'-thienyl group, or a 3'-thienyl group. The new compounds of this invention are potent implantation inhibitors, exceptionally active when administered orally. Some of these compounds for example, 7α,8-epoxy-17α-(3'-furyl)-3-methoxyestra-1,3,5(10)-triene-17-ol, are many times more potent than related compounds outside the scope of this invention.

The compounds of this invention may be formulated in solution in suitable vehicles such as, for example, vegetable oils, for subcutaneous or intramuscular injections. They may also be formulated in the form of tablets or capsules with pharmaceutically acceptable excipients for oral administration. They may be administered in daily doses containing from 10 to 500 micrograms of the active ingredient.

Noteworthy is the unnatural configuration of these new compounds due to the 7α,8-attachment of the epoxide ring. As a result, rings B and C of the steroid nucleus are cis-fused and these new steroids hae a folded, rather than a planar, "natural," configuration of the tetracyclic system. In view of this fact, it is interesting and surprising that these new steroids are powerful implantation inhibitors.

The preferred starting materials for the preparation of the compounds of this invention are represented by Formula II:

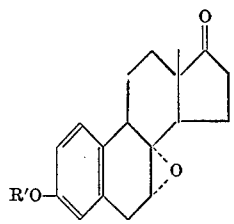

II in which R' represents hydrogen, or lower alkyl group, such as, for example, the methyl, ethyl, propyl, isopropyl, butyl, or the sec.-butyl group or a cycloalkyl group such as, for example, the cyclopentyl group or the tetrahydropyranyl group. These starting materials are readily obtained by treatment of equilin or the appropriate 3-alkyl or cycloalkyl ether of equilin with a peracid such as, for example, peracetic acid, perbenzoic acid or m-chloroperbenzoic acid in an inert solvent, such as, for example, ether, benzene, chloroform, or tetrahydrofuran.

The products of this invention are obtained when the starting materials of Formula II are treated with organo-derivatives of alkali metals, such as, for example, methyl, lithium, potassium, sodium or lithium acetylide, 2-furyllithium, 3-furyllithium or 2-thienyllithium, 3-thienyllithium or a Grignard reagent, such as, for example, ethyl magnesium bromide, vinyl magnesium bromide, or ethinyl magnesium chloride in an inert solvent such as, for example, ether, benzene, toluene, tetrahydrofuran, or any mixture thereof at temperatures between room temperature and the reflux temperature of the respective solvent or solvent mixture, to yield the corresponding 17α-substituted compound of Formula I, in which R' represents hydrogen, a lower alkyl group or a cycloalkyl group or the tetrahydropyranyl group, R represents hydrogen, and Y has the same significance as defined above.

The 17α-ethinyl derivatives of this invention are useful as intermediates for the preparation of their corresponding 17α-vinyl and 17α-ethyl derivatives.

For example, 7α,8-epoxy-17α-ethinyl-3-methoxyestra-1,3,5(10)-trien-17-ol, is preferentially hydrogenated in the presence of Lindlar catalyst [H. Lindlar, Helv. Chem. Acta., 35, 446 (1952)], and hydrogen to yield 7α,8-epoxy-3-methoxy-17α-vinylestra-1,3,5(10)-trien-17-ol, which gives 7α,8-epoxy-17α-ethyl-3-methoxyestra-1,3,5-trien-17-ol on treatment with hydrogen and palladium-carbon catalyst.

When preparing the products of this invention of Formula I where R' represents hydrogen, we prefer to use 7α,8 - epoxy-3-tetrahydropyranyloxyestra-1,3,5(10) trien-17-one as starting material. The 17-substituted-7α,8-epoxy - 3 - tetrahydropyranyloxyestra-1,3,5(10)trien-17-one is then prepared by the method just described and subsequent removal of the tetrahydropyranyl group gives the products of Formula I where R represents hydrogen. These latter products are useful as intermediates for alternate preparations of their corresponding 3-alkyl and 3-cycloalkyl ethers; when utilized for this purpose they are treated according to the method used to synthesize the known ethers of estrone [F. Glockling and D. Kingston, Chim. and Ind., 1037 (1961)].

Esterification of the free phenolic hydroxyl in position 3 is achieved by conventional means with acid anhydrides and acid chlorides in pyridine at room temperature to yield the corresponding 3-acyl derivatives. In order to achieve esterification of the tertiary hydroxyl group in position 17 more drastic conditions are required, such as the use of mixtures of acid anhydrides and the acid chlorides in pyridine at temperature between room temperature and 100° C. for extended periods of time as for example 1 to 5 days; the corresponding 17-acyl derivatives are thus obtained. If a free phenolic hydroxyl group should also be present in the molecule it will also be esterified under those conditions.

The resulting 3,17-diacyl derivative can be preferentially hydrolyzed to the corresponding 17-acyl-3-hydroxy derivative by means of a base such as sodium or potassium carbonate or sodium or potassium bicarbonate.

For the preparation of the sulfate esters, the respective diols, or preferably the 17-acyl-3-hydroxy derivatives which are less susceptible to dehydration under the conditions of the following reaction are treated with chlorosulfonic acid in the presence of a suitable organic base such as, for example, pyridine or dimethylaniline in an inert solvent. The base salt of the resulting sulfate ester may be purified by conversion to a suitable insoluble salt, such as, for example, to the quinidine salt, which may be purified by washing or by crystallization; or the ammonium salt which may be purified by extraction with a suitable solvent such as, for example, n-butanol. The resulting quidinine or amonium salt may be converted to other base salts such as, for example, the sodium or potassium salts by treatment with the appropriate free base.

Subsequent conversion of the 17β-acylated derivative to the corresponding 17-hydroxylated compounds is effected by treatment with aqueous sodium or potassium hydroxide.

The following examples will illustrate our invention.

EXAMPLE 1

The higher ether homologues of equilin are prepared by the method of Glockling and Kingston described in Chem. and Ind., 1037 (1961) by the action of the corresponding alkyl halides on the sodium or potassium salts of the phenols. Accordingly, equilin-3-ethyl ether, equilin-3-propyl ether, equilin-3-isopropyl ether, equilin-3-n-butyl ether, equilin-3-sec.-butyl ether, equilin-3-cyclopentyl ether, equilin-3-cyclohexyl ether are obtained. The corresponding tetrahydropyranyl ether is prepared according to the method described by A. D. Cross et al. in Steroids, vol. 4, p. 423 (1964).

EXAMPLE 2

M-chloroperbenzoic acid (4.05 g.) is added by portions over a period of 30 minutes to a stirred, ice-cold, solution of equilin 3-methyl ether (5 g.). The mixture is stirred for an additional 2 hours in the ice-bath and then for 30 minutes at room temperature. The solution is washed with a 5% sodium carbonate solution and with water, dried and evaporated. The colour is removed from the crude crystalline product by filtration on a column of alumina. The fractions eluted with 1:1 benzenepetroleum ether are combined and crystallized from methanol to yield 7α,8-epoxy-3-methoxyestra-1,3,5(10)trien-17-one, M.P. 176–178° C.

By a similar procedure the higher ethers of equilin, obtained in Example 1 are oxidized to the corresponding 7α,8-epoxy derivatives, when treated with -chloroperbenzoic acid in chloroform solution. In this manner there are obtained:

7α,8-epoxy-3-ethoxy estra-1,3,5(10)trien-17-one,
7α,8-epoxy-3-propoxy estra-1,3,5(10)trien-17-one,
7α,8-epoxy-3-isopropoxy estra-1,3,5(10)trien-17-one,
3-n-butoxy-7α,8-epoxy estra-1,3,5(10)trien-17-one,
3-sec.-butoxy-7α,8-epoxy estra-1,3,5(10)trien-17-one,
3-cyclopentyloxy-7α,8-epoxy estra-1,3,5(10)trien-17-one,
3-cyclohexyloxy-7α,8-epoxy estra-1,3,5(10)trien-17-one.

EXAMPLE 3

M-chloroperbenzoic acid (25.8 g.) is added by portions to a stirred, ice-cold suspension of equilin (25.0 g.), in chloroform (500 ml.). After 3 hours, the solution is washed four times with a 5% sodium carbonate solution and with water, dried and evaporated.

The dark red oil, dissolved in benzene (750 ml.), is stirred under nitrogen for 3 hours with dihydropyran (30 ml.), and p-toluenesulfonic acid (500 mg.). Pyridine (0.5 ml.), is added and the solution is washed with water, dried and evaporated. The crude product is chromatographed in Florisil. Elution with mixtures of benzene and ether yields 7α,8 - epoxy-3-tetrahydropyranyloxyestra-1,3,5(10)trien-17-one.

EXAMPLE 4

A solution of 3-iodofuran (5 g.), ether (100 ml.), and a 1.47 N ethereal solution of n-butyllithium (13.6 ml.), is stirred at −60° C. for 30 minutes. A solution of 7α,8-epoxy-3-methoxyestra-1,3,5(10)trien-17-one (5 g.), obtained in Example 2, in toluene (200 ml.), is then added and the mixture is stirred at room temperature for 16 hours. Ether and water are added. The organic phase is separated and further washed with water. After drying and evaporating the solvents, the solvent residue is crystallized several times wtih methylene chloride ether to give 7α,8-epoxy-17α-[3'-furyl]-3-methoxyestra-1,3,5(10)trien-17-ol, M.P. 223–225° C.

By a similar procedure, the higher 3-alkyl ethers of 7α,8 - epoxy - 3 - hydroxyestra-1,3,5(10)trien-17-one, described in Example 2, are treated with 3-furyllithium to yield the corresponding 17α-[3'-furyl]-17β-hydroxy derivatives such as:

7α,8-epoxy-3-ethoxy-17α-[3'-furyl]estra-1,3,5(10)trien-17-ol,
7α,8-epoxy-17α-[3'-furyl]-3-propoxy estra-1,3,5(10)trien-17-ol,
7α,8-epoxy-17α-[3'-furyl]-3-iscopropoxy estra-1,3,5(10)trien-17-ol,
3-n-butoxy-7α,8-epoxy-17α-[3-furyl]estra-1,3,5(10)trien-17-ol,
3-sec.-butoxy-7α,8-epoxy-17α-[3'-furyl]estra-1,3,5(10)trien-17-ol,
3-cyclopentyloxy-7α,8-epoxy-17α-[3'-furyl]estra-1,3,5(10)trien-17-ol,
3-cyclohexyloxy-7α,8-epoxy-17α-[3'-furyl]estra-1,3,5(10)trien-17-ol.

EXAMPLE 5

A solution of 3-iodofuran (25 g.), ether (500 ml.), and a 1.52 N ethereal solution of n-butyllithium (73.5 ml.), is stirred at −60° C. for 30 minutes. Then a solution of 7α - 8 - epoxy - 3 - tetrahydropyranyloxyestra-1,3,5(10)trien-17-one (25 g.), described in Example 3, in toluene (1000 ml.), is added. After stirring the mixture for 16 hours at room temperature the solution is diluted with ether, washed with water, dried and evaporated to dryness to yield 7α,8 - epoxy - 17α - [3′-furyl]-3-tetrahydropyranyloxyestra-1,3,5(10)trien-17-ol.

EXAMPLE 6

A solution of furan (4.1 g.), ether (82 ml.), and a 1.52 N ethereal solution of n-butyllithium (37.2 ml.), is stirred at room temperature for 1 hour. Then a solution of 7α,8 - epoxy - 3 - methoxyestra - 1,3,5(10)trien - 17 - one (4.1 g.), obtained in Example 2, in toluene (164 ml.) is added and the mixture is stirred at room temperature for 16 hours. Ether and water are added. The organic phase is further washed with water, dried and evaporated to dryness, leaving a solid which upon crystallization from methylene chloride ether yields 7α,8-epoxy-17α-[2′-furyl]-methoxyestra-1,3,5(10)trien-17-ol, M.P. 188–190° C.

Similarly, the higher ether homologues of 7α,8-epoxy-3-hydroxyestra-1,3,5(10)triene-17-one are transformed when treated with 2-furyllithium to the corresponding 17α-[2′-furyl]-17β-hydroxy derivatives, such as:

7α,8-epoxy-3-ethoxy-17α-[2′-furyl]-estra-1,3,5(10)trien-17-ol,
7α,8-epoxy-17α-[2′-furyl]-3-propoxyestra-1,3,5(10)trien-17-ol,
7α,8-epoxy-17α-[2′-furyl]-3-isopropoxyestra-1,3,5(10)trien-17-ol,
3-n-butoxy-7α,8-epoxy-17α-[2′-furyl]-estra-1,3,5(10)trien-17-ol,
3-sec.-butoxy-7α,8-epoxy-17α-[2′-furyl]-estra-1,3,5(10)trien-17-ol,
3-cyclopentyloxy-7α,8-epoxy-17α-[2′-furyl]estra-1,3,5(10)trien-17-ol,
3-cyclohexyloxy-7α,8-epoxy-17α-[2′-furyl]-estra-1,3,5(10)trien-17-ol, and
7α,8-epoxy-17α-[2′furyl]-3-tetrahydropyranyloxyestra-1,3,5(10)trien-17-ol.

A solution of freshly distilled thiophene (4.0 g.), in ether (80 ml.), is stirred at −10° C. for one hour with an 1.55 N ethereal solution of n-butyllithium (29.3 ml.). Then a solution of 7α,8-epoxy-3-methoxyestra-1,3,5(10)trien-17-one (4.0 g.), in toluene (80 ml.), is added and the mixture is stirred at room temperature for 16 hours. Ethyl acetate and water are added; the organic phase is separated and further washed with water, dried and evaporated. The residue is crystallized from methanol, the acetone to yield 7α,8 - epoxy - 3 - methoxy-17α-[2′-thienyl]estra-1,3,5(10)trien-17-ol, M.P. 206–207° C.

Similarly there are obtained:

7α,8-epoxy-3-ethoxy-17α-[2′-thienyl]estra-1,3,5(10)trien-17-ol,
7α,8-epoxy-3-propoxy-17α-[2′-thienyl]estra-1,3,5(10)-trien-17-ol,
7α,8-epoxy-3-isopropoxy-17α-[2′-thienyl]estra-1,3,5(10)-trien-17-ol,
3-n-butoxy-7α,8-epoxy-17α-[2′-thienyl]estra-1,3,5(10)-trien-17-ol,
3-sec.-butoxy-7α,8-epoxy-17α-[2′-thienyl]estra-1,3,5(10)-trien-17-ol,
3-cyclopentyloxy-7α,8-epoxy-17α-[2′-thienyl]estra-1,3,5(10)-trien-17-ol,
3-cyclohexyloxy-7α,8-epoxy-17α-[2′-thienyl]estra-1,3,5(10)-trien-17-ol,
7α,8-epoxy-3-tetrahydropyranyloxy-17α-[2′thienyl]-estra-1,3,5(10)-trien-17-ol, when the higher ethers of 7α,8-epoxy-3-hydroxyestra-trien-1,3,5(10)trien-17-one are treated with 2-thienyllithium.

By a similar procedure, but replacing 2-thienyllithium by 3-thienyllithium, prepared according to the procedure of S. Gronowitz, Arkiv. for Kemi, 7, 361, (1954), the 3-alkyl ethers of 7α,8-epoxy-2-hydroxyestra-1,3,5(10)trien-17-one are transformed into the corresponding 17α-[3′-thienyl]-17β-hydroxy derivatives such as:

7α,8-epoxy-3-methoxy-17α-[3′-thienyl]estra-1,3,5(10)trien-17-ol,
7α,8-epoxy-3-ethoxy-17α-[3′-thienyl]estra-1,3,5(10)-trien-17-ol,
7α,8-epoxy-3-propoxy-17α-[3′-thienyl]estra-1,3,5(10)trien-17-ol,
7α,8-epoxy-3-isopropoxy-17α-[3′thienyl]estra-1,3,5(10)trien-17-ol,
3-n-butoxy-7α,8-epoxy-17α-[3′-thienyl]estra-1,3,5(10)trien-17-ol,
3-sec.-butoxy-7α,8-epoxy-17α-[3′-thienyl]estra-1,3,5(10)trien-17-ol,
3-cyclopentyloxy-7α,8-epoxy-17α-[3′thienyl]estra-1,3,5(10)trien-17-ol,
3-cyclohexyloxy-7α,8-epoxy-[3′-thienyl]estra-1,3,5(10)trien-17-ol and
7α,8-epoxy-3-tetrahydropyranyloxy-17α-[3′-thienyl]-1,3,5(10)trien-17-ol.

EXAMPLE 7

A mixture of 7α,8-epoxy-3-methoxyestra-1,3,5(10)trien-17-one (5 g.), tetrahydrofuran (125 ml.), and a 3 N ethereal solution of methyl magnesium bromide (60 ml.) is refluxed overnight. The mixture is cooled at 0° C. and the complexes are decomposed with a saturated ammonium chloride solution. Ether and dilute sulfuric acid are added. The ether layer is then washed with sodium bicarbonate and water, dried and evaporated. 7α,8-epoxy-3-methoxy-17α-methylestra-1,3,5(10)trien-17β-ol is purified by chromatography on alumina.

Similarly, there are obtained:

7α,8-epoxy-3-ethoxy-17α-methylestra-1,3,5(10)trien-17-ol,
7α,8-epoxy-17α-methylestra-1,3,5(10)trien-17-ol,
7α-8-epoxy-17α-methyl-3-isopropoxyestra-1,3-5(10)trien-17-ol,
3-n-butoxy-7α,8-epoxy-17α-methylsetra-1,3,5(10)trien-17-ol,
3-sec.-butoxy-7α,8-epoxy-17α-methylestra-1,3,5(10)trien-17-ol,
3-cyclopentyloxy-7α,8-epoxy-17α-methylestra-1,3,5(10)trien-17-ol,
3-cyclohexyloxy-7α,8-epoxy-17α-methylestra-1,3,5(10)trien-17-ol,
7α,8-epoxy-17α-methyl-3-tetrahydropyranloxyestra-1,3,5(10)trien-17-ol, when the respective higher ethers of 7α,8-epoxyestra-1,3,5(10)trien-17-diol are treated with methyllithium or methyl magnesium bromide.

By a similar procedure but replacing methylmagnesium bromide with ethylmagnesium bromide, propylmagnesium bromide, n-butylmagnesium bromide and vinylmagnesium bromide the 3-alkyl ethers are transformed into the corresponding 17α-alkyl-17β-hydroxy derivatives such as:

7α,8-epoxy-3-methoxyestra-1,3,5,(10)trien-17-ol,
7α,8-epoxy-3-methoxy-17α-propylestra-1,3,5(10)trien-17-ol,
17α-n-butyl-7α,8-epoxy-3-methoxyestra-1,3,5(10)trien-17-ol,
7α,8-epoxy-3-methoxy-17α-methylestra-1,3,5(10)trien-17-ol,
7α,8-epoxy-3-ethoxy-17α-ethylestra-1,3,5(10)trien-17-ol,
7α,8-epoxy-3-ethoxy-propylestra-1,3,5(10)trien-17-ol,
17α-n-butyl-7α,8-epoxy-3-ethoxyestra-1,3,5(10)trien-17-ol,
7α,8-epoxy-3-ethoxy-17α-vinylestra-1,3,5(10)trien-17-ol,
7α,8-epoxy-17α-ethyl-3-propoxyestra-1,3,5(10)trien-17-ol,
7α,8-epoxy-3-propoxy-17α-propylestra-1,3,5(10)trien-17-ol, 17α-n-butyl-7α,8-epoxy-3-propoxyestra-1,3,5(10)trien-17-ol,
7α,8-epoxy-3-propoxy-17α-vinylestra-1,3,5(10)trien-17-ol,
7α,8-epoxy-3-propoxy-17α-vinylestra-1,3,5(10)trien-17-ol,
7α,8-epoxy-17α-ethyl-3-isopropoxyestra-1,3,5(10)trien-17-ol,
7α,8-epoxy-3-isopropoxy-17α-propylestra-1,3,5(10)trien-17-ol,
17α-n-butoxy-7α,8-epoxy-3-isopropoxyestra-1,3,5(10)trien-17-ol,
7α,8-epoxy-3-isopropoxy-17α-vinylestra-1,3,5(10)trien-17-ol,
3-n-butoxy-7α,8-epox-17α-ethylestra-1,3,5(10)trien-17-ol,
3-n-butoxy-7α,8-epoxy-17α-propylestra-1,3,5(10)trien-17-ol,
3-n-butoxy-17α-n-butyl-7α,8-epoxyestra-1,3,5(10)trien-17-ol,
3-n-butoxy-7α,8-epoxy-17α-vinylestra-1,3,5,(10)trien-17-ol,
3-sec.-butoxy-7α,8-epoxy-17α-ethylestra-1,3,5(10)trien-17-ol,
3-sec.-butoxy-7α,8-epoxy-17α-propylestra-1,3,5(10)trien-17-ol,
3-sec.-butoxy-17α-butyl-7α,8-epoxyestra-1,3,5(10)trien-17-ol,
3-sec.-butoxy-7α,8-epoxy-17α-vinylestra-1,3,5(10)trien-17-ol,
3-cyclopentyloxy-7α,8-epoxy-17α-ethylestra-1,3,5(10)trien-17-ol,
3-cyclopentyloxy-7α,8-epoxy-17α-propoxyestra-1,3,5(10)trien-17-ol,
17α-n-butyl-3-cyclopentyloxy-7α,8-epoxyestra-1,3,5(10)trien-17-ol,
3-cyclopentyloxy-7α,8-epoxy-17α-vinylestra-1,3,5(10)trien-17-ol,
3-cyclothexyloxy-7α,8-epoxy-17α-ethylestra-1,3,5(10)trien-17-ol,
3-cyclohexyloxy-7α,8-epoxy-17α-propylestra-1,3,5(10)trien-17-ol,
17α-n-butyl-3-cyclohexyloxy-7α,8-epoxyestra-1,3,5(10)trien-17-ol,
3-cyclohexyloxy-7α,8-epoxy-17α-vinylestra-1,3,5(10)trien-17-ol,
7α,8-epoxy-17α-ethyl-3-tetrahydropyranyloxyestra-1,3,5(10)trien-17-ol,
7α,8-epoxy-17α-propyl-3-tetrahydropyranyloxyestra-1,3,5(10)trien-17-ol,
17α-n-butyl-7α,8-epoxy-3-tetrahydropyranyloxyestra-1,3,5(10)trien-7-ol,
7α,8-epoxy-3-tetrahydropyranyloxy-17α-vinylestra-1,3,5(10)trien-7-ol.

EXAMPLE 8

An 18% suspension of sodium acetylide in xylene (30 ml.), is centrifuged. The xylene is removed and the solid is suspended in a small volume of dry tetrahydrofuran, which was removed by centrifugation. After repeating the latter procedure once more, the solid is suspended in dimethylsulfoxide (80 ml.), and the suspension is added to a solution of 7α,8-epoxy-3-methoxyestra-1,3,5(10)-trien-17-one (4 g.), in dimethylsulfoxide (30 ml.), and tetrahydrofuran (25 ml.). The mixture is stirred at room temperature for 1 hour, and then is cooled in ice. Ice-cold water (150 ml.), is added slowly and the mixture is extracted with ether. The ether solution is washed with water, dried and evaporated. The residue is purified by chromatography on alumina to yield 7α,8-epoxy-17α-ethinyl-3-methoxyestra1,3,5(10)trien-17-ol, ν max. 3580, 3315 cm.$^{-1}$.

Similarly there are obtained:

7α,8-epoxy-17α-ethinyl-3-ethoxyestra-1,3,5(10)trien-17-ol,
7α,8-epoxy-17α-ethinyl-3-propoxyestra-1,3,5(10)trien-17-ol,
7α,8-epoxy-17α-ethinyl-3-isopropoxyestra-1,3,5(10)trien-17-ol,
3-n-butoxy-7α,8-epoxy-17α-ethinylestra-1,3,5(10)trien-17-ol,
3-sec.-butoxy-7α,8-epoxy-17α-ethinylestra-1,3,5(10)trien-17-ol,
3-cyclopentyloxy-7α,8-epoxy-17α-ethinylestra-1,3,5(10)trien-17-ol,
3-cyclohexyloxy-7α,8-epoxy-17α-ethinylestra-1,3,5(10)trien-17-ol,
7α,8-epoxy-17α-ethinyl-3-tetrahydropyranyloxyestra-1,3,5(10)trien-17β-ol, when the higher ethers of 7α,8-epoxyestra-1,3,5(10)triene-3,17β-diol are treated with sodium acetylide.

EXAMPLE 9

A solution of 7α,8-epoxy-17α-ethinyl-3-hydroxyestra-1,3,5(10)trien-17-ol (5.0 g), in dioxane (90 ml.), and pyridine (10 ml.), was stirred under hydrogen at atmospheric conditions in the presence of 5% palladium on calcium carbonate (1.0 g), until an equivalent of hydrogen was absorbed. The catalysts are removed by filtration and the filtrate concentrated to yield 7α,8-epoxy-3-hydroxy-17α-vinylestra-1,3,5(10)trien-17-ol as an amorphous solid, ν max. 3220, 2904, 1630 cm.$^{-1}$.

Similarly there are obtained:

7α,8-epoxy-3-methoxy-17α-vinylestra-1,3,5(10)trien-17-ol,
7α,8-epoxy-3-ethoxy-17α-vinylestra-1,3,5(10)trien-17-ol,
7α,8-epoxy-3-propoxy-17α-vinylestra-1,3,5(10)-trien-17-ol,
7α,8-epoxy-3-isopropoxy-17α-vinylestra-1,3,5(10)-trien-17-ol,
3-n-butoxy-7α,8-epoxy-17α-vinylestra-1,3,5(10)-trien-17-ol,
3-sec.-butoxy-7α,8-epoxy-17α-vinylestra-1,3,5(10)-trien-17-ol,
3-cyclopentyloxy-7α,8-epoxy-17α-vinylestra-1,3,5(10)-trien-17-ol,
3-cyclohexyloxy-7α,8-epoxy-17α-vinylestra-1,3,5(10)-trien-17-ol,
7α,8-epoxy-3-tetrahydropyranyloxy-17α-vinylestra-1,3,5(10)trien-17-ol, when the respective ether analogs of 7α,8-epoxy-17α-ethinyl-3-hydroxyestra-1,3,5(10)trien-17-ol, are treated in the same manner.

EXAMPLE 10

A solution of 7α,8-epoxy-3-hydroxy-17α-vinylestra-1,3,5(10)-trien-17-ol (5.0 g.), in ethyl alcohol (100 ml.) is treated with hydrogen at atmospheric pressure in the presence of 5% palladium on charcoal (0.5 g.), at room temperature. After one equivalent of hydrogen has been absorbed the catalyst is collected and the filtrate is concentrated to yield 7α,8-epoxy-17α-ethyl-3-hydroxyestra-1,3,5(10)-trien-17-ol.

Similarly there are obtained

7α,8-epoxy-17α-ethyl-3-methoxyestra-1,3,5(10)-trien-17-ol,
7α,8-epoxy-3-ethoxy-17α-ethylestra-1,3,5(10)-trien-17-ol,
7α,8-epoxy-17α-ethyl-3-propoxyestra-1,3,5(10)-trien-17-ol,
7α,8-epoxy-17α-ethyl-3-isopropoxyestra-1,3,5(10)-trien-17-ol,
3-n-butoxy-7α,8-epoxy-17α-ethylestra-1,3,5(10)-trien-17-ol,
3-sec.-butoxy-7α,8-epoxy-17α-ethylestra-1,3,5(10)-trien-17-ol,
3-cyclopentyloxy-7α,8-epoxy-17α-ethylestra-1,3,5(10)-trien-17-ol, 3-cyclohexyloxy-7α,8-epoxy-17α-ethylestra-1,3,5(10)-trien-17-ol,
and 7α,8-epoxy-3-tetrahydropyranyloxy-17α-ethylestra-1,3,5(10)-trien-17-ol, when the respective ether analogs of 7α,8-epoxy-3-hydroxy-17α-vinylestra-1,3,5(10)-trien-17-ol, are treated in the same manner.

EXAMPLE 11

A solution of 7α,8-epoxy-17α-[3'-furyl]-3-tetrahydropyranyloxyestra-1,3,5(10)-trien-17-ol (31.1 g.), obtained in Example 5, in methanol (1244 ml.), is stirred for 1 hour at room temperature with an 0.1 N solution of hydrochloric acid (311 ml.). Water (1800 ml.), is added and the resulting solid is filtered, well washed with water and dried. Several crystallizations of this solid with nitro methane yields 7α,8-epoxy-17α-[3'-furyl]estra-1,3,5(10)-triene-3,17-diol, M.P. 154–156° C.

By a similar procedure hydrolysis of the tetrahydropyranyl ethers of other 17α-substituted derivatives of 7α,8-epoxyestra-1,3,5(10)-trien-17-diol yields respectively:

7α,8-epoxy-17α-[2'-furyl]estra-1,3,5(10)-triene-3,17-diol,
7α,8-epoxy-17α-[2'-thienyl]estra-1,3,5(10)-triene-3,17-diol,
7α,8-epoxy-17α-[3'-thienyl]estra-1,3,5(10)-triene-3,17-diol,
7α,8-epoxy-17α-methylestra-1,3,5(10)-triene-3,17-diol,
7α,8-epoxy-17α-ethylestra-1,3,5(10)-triene-3,17-diol,
7α,8-epoxy-17α-propylestra-1,3,5(10)-triene-3,17-diol,
17α-n-butyl-7α,8-epoxyestra-1,3,5(10)-triene-3,17-diol,
7α,8-epoxy-17α-vinylestra-1,3,5(10)-triene-3,17-diol,
7α,8-epoxy-17α-ethinylestra-1,3,5(10)-triene-3,17-diol.

EXAMPLE 12

A mixture of 7α,8-epoxy-17α-[3'-furyl]-estra-1,3,5(10)-triene-3,17-diol (5 g.), obtained in Example 10, ethanol (99%) (100 ml.), potassium carbonate (10 g.), and bromocyclopentane (10 g.), is refluxed for 90 minutes. Additional quantities of potassium carbonate (5 g.), and bromocyclopentane (5 g.) are added and the heating is continued for 90 minutes. After cooling the mixture, the solid is filtered and washed with ethanol, the filtrate is diluted with ether and methylene chloride. The organic solutions washed with Claisen's alkali and water. After drying and evaporating the solvents, the residue is chromatographed on alumina. The fractions eluted with mixtures of benzene and hexane are combined and crystallized from acetone-hexane to yield 3-cyclopentyloxy-7α,8-epoxy-17α-[3'-furyl]estra-1,3,5(10)-trien-17-ol, M.P. 162–163° C.

EXAMPLE 13

A solution of 7α,8-epoxy-17α-[3'-furyl]estra-1,3,5(10)-triene-3,17-diol, (5 g.), obtained in Example 10, in pyridine (50 ml.), and acetic anhydride (50 ml.), is stirred at room temperature for 2½ hours. The solution is diluted with ice-water and is extracted with ether. The ether is washed with dilute sulfuric acid, water, sodium bicarbonate, and water, again to neutrality. The solution is dried and evaporated to yield 3-acetoxy-7α,8-epoxy-17α-[3'-furyl]-estra-1,3,5(10)-trien-17-ol as an amorphous solid.

Similarly acetylation with acetic anhydride in pyridine solutions of the other 17α-substituted 7α,8-expoxyestra-1,3,5(10)-triene-3,17-diol, obtained in Example 10, yields respectively:

3-acetoxy-7α,8-epoxy-17α-[2'-furyl]estra-1,3,5(10)-trien-17-ol,
3-acetoxy-7α,8-epoxy-17α-[2'-thienyl]estra-1,3,5(10)-trien-17-ol,
3-acetoxy-7α,8-epoxy-17α-[3'-thienyl]estra-1,3,5(10)-trien-17-ol,
3-acetoxy-7α,8-epoxy-17α-methylestra-1,3,5(10)-trien-17-ol,
3-acetoxy-7α,8-epoxy-17α-ethylestra-1,3,5(10)-trien-17-ol,
3-acetoxy-7α,8-epoxy-17α-propylestra-1,3,5(10)-trien-17-ol,
3-acetoxy-17α-n-butyl-7α,8-epoxyestra-1,3,5(10)-trien-17-ol,
3-acetoxy-7α,8-epoxy-17α-vinylestra-1,3,5(10)-trien-17-ol, and
3-acetoxy-7α,8-epoxy-17α-ethinylestra-1,3,5(10)-trien-17-ol.

By substituting for acetic anhydride in the above procedure propionic, butyric, or succinic anhydrides or benzoyl chlorides, hexahydrobenzyl chloride or cyclopentylpropionyl chloride the corresponding 3-propionates, 3-butyrates, 3-succinates, 3-benzoates, 3-hexahydrobenzoates, 3-cyclopentyl propionates of 7α,8-epoxy-17α-[3'-furyl]-estra-1,3,5(10)-triene-3,17-diol,
7α,8-epoxy-17α-[2'-furyl]-estra-1,3,5(10)-triene-3,17-diol,
7α,8-epoxy-17α-[2'-thienyl]-estra-1,3,5(10)-triene-3,17-diol,
7α,8-epoxy-17α-[3'-furyl]-estra-1,3,5(10)-triene diol,
7α,8-epoxy-17α-methylestra-1,3,5(10)-triene-3,17-diol,
7α,8-epoxy-17α-ethylestra-1,3,5(10)-triene-3,17-diol,
7α,8-epoxy-17α-propylestra-1,3,5(10)-triene-3,17-diol,
17α-n-butyl-7α,8-epoxyestra-1,3,5(10)-triene-3,17-diol,
7α,8-epoxy-17α-vinylestra-1,3,5(10)-triene-3,17-diol,
7α,8-epoxy-17α-ethinylestra-1,3,5(10)-triene-3,17-diol are obtained.

EXAMPLE 14

A solution of 7α,8-epoxy-17α-[3'-furyl]-estra-1,3,5(10)-triene-3,17-diol (6.32 g.), in pyridine (63 ml.), and acetic anhydride (63 ml.), is heated on the steam bath for 24 hours. The reaction product is isolated as in Example 12. The crude solid residue is chromatographed on alumina. The fractions eluted with mixtures of benzene-hexane and benzene are combined and crystallized from methylene chloride-ether to yield 3,17β-diacetoxy-7α,8-epoxy-17α-[3'-furyl]-estra-1,3,5(10)-triene, M.P. 209–210° C.

By substituting in the above procedure acetic anhydride by propionic or butyric anhyride 3,17β-dipropionyloxy-7α,8-epoxy-17α - [3'-furyl] - estra - 1,3,5(10) - triene and 3,17β - dibutanoyloxy - 7α,8 - epoxy - 17α-[3'-furyl]estra-1,3,5(10)-triene are obtained.

Similarly acylation with acetic, propionic or butyric anhydrides in pyridine solutions at 100° C. for 24 hours of the other 17α-substituted 7α,8-epoxyestra-1,3,5(10)-triene-3,17-diols, yields respectively the 3,17β-diacetates, 3,17β-dipropionates, or 3,17β-dibutyrates of:

7α,8-epoxy-17α-[2'-furyl]estra-1,3,5(10)-triene-3,17-diol,
7α,8-epoxy-17α-[2'-thienyl]estra-1,3,5(10)-triene-3,17-diol,
7α,8-epoxy-17α-[3'-thienyl]estra-1,3,5(10)-triene-3,17-diol,
7α,8-epoxy-17α-methylestra-1,3,5(10)-triene-3,17-diol,
7α,8-epoxy-17α-ethylestra-1,3,5(10)-triene-3,17-diol,
7α,8-epoxy-17α-propylestra-1,3,5(10)-triene-3,17-diol,
17α-n-butyl-7α,8-epoxyestra-1,3,5(10)-triene-3,17-diol,
7α,8-epoxy-17α-vinylestra-1,3,5(10)-triene-3,17-diol,
7α,8-epoxy-17α-ethinylestra-1,3,5(10)-triene-3,17-diol.

EXAMPLE 15

A solution of 7α,8-epoxy-17α-[3'-furyl]-3-methoxyestra-1,3,5(10)-trien-17-ol, in pyridine (47.5 ml.), and acetic anhydride (47.5 ml.) is heated on a steam bath for 24 hours. The reaction product is isolated as in Example 12, and chromatographed on alumina. The fractions eluted with mixtures of benzene-hexane and are combined and crystallized from methanol to yield 17β-acetoxy-7α,8-epoxy-17α-[3'-furyl]-3-methoxyestra - 1,3,5(10) - triene, M.P. 183–185° C.

Similarly a solution of 3-cyclopentyloxy-7α,8-epoxy-

17α-[3′-furyl]estra-1,3,5(10)-trien-17-ol, (3.32 g.), pyridine (33 ml.), and acetic anhydride (33 ml.), is heated on the steam bath for 24 hours. The crude reaction product is chromatographed on alumina. The fractions eluted with benzene and hexane are combined and crystallized from acetone-hexane to yield 17β-acetoxy-3-cyclopentyloxy-7α,8-epoxy 17α-[3′-furyl]-estra-1,3,5(10)-triene, M.P. 206–207° C.

Similarly acetylation of the other 3-alkyl ethers of 7α,8-epoxy-17α-[3′-furyl]estra - 1,3,5(10) - triene - 3,17 - diol, yields the 17β-acetates of the 3-ethyl, 3-propyl, 3-isopropyl, 3-n-butyl, 3-sec.-butyl, 3-cyclohexyl, and the 3-tetrahydropyranyl ethers of 7α,8-epoxy-17α-[3′-furyl]estra-1,3,5(10)-triene-3,17-diol.

By a similar procedure acylation, using propionic or butyric anhydrides of the 3-alkyl ethers of 7α,8-epoxy-17α-[3′-furyl]estra-1,3,5(10)-triene - 3,17 - diol, yields respectively the 17β-propionates and 17β-butyrates of the 3-methyl, 3-ethyl, 3-propyl, 3-isopropyl, 3-n-butyl, 3-sec.-butyl, 3-cyclopentyl, 3-cyclohexyl, and 3-tetrahydropyranyl ethers of 7α,8-epoxy-17α - [3′ - furyl]estra - 1,3,5(10)-triene-3,17-diol.

Similarly acylation with acetic, propionic, or butyric anhydrides of the 3-alkyl ethers of the other 17α-substituted-7α,8-epoxyestra-1,3,5(10)-triene-3,17-diols yields the 17β-acetates, 17β-propionates and 17β-butyrates of the 3-methyl, 3-ethyl, 3-propyl, 3-isopropyl, 3-n-butyl, 3-sec.-butyl, 3-cyclopentyl, 3-cyclohexyl, and 3-tetrahydropyranyl ethers of 7α,8-epoxy-17α-[2′-furyl]estra-1,3,5(10)-triene-3,17-diol,
7α,8-epoxy-17α-[2′-thienyl]estra-1,3,5(10)-triene-3,17-diol,
7α,8-epoxy-17α-[3′-thienyl]estra-1,3,5(10)-triene-3,17-diol,
7α,8-epoxy-17α-methylestra-1,3,5(10)-triene-3,17-diol,
7α,8-epoxy-17α-ethylestra-1,3,5(10)-triene-3,17-diol,
7α,8-epoxy-17α-propylestra-1,3,5(10)-triene-3,17-diol,
17-n-butyl-7α,8-epoxyestra-1,3,5(10)-triene-3,17-diol,
7α,8-epoxy-17α-vinylestra-1,3,5(10)-triene-3,17-diol, and
7α,8-epoxy-17α-ethinylestra-1,3,5(10)-triene-3,17-diol.

EXAMPLE 16

A mixture of 3,17β-diacetoxy-7α,8-epoxy-17-[3′-furyl]estra-1,3,5(10)-triene (500 mg.), obtained in Example 13, in potassium carbonate (500 mg.), methanol (75 ml.), and water (1.2 ml.), is stirred at room temperature for 1 hour. Water (200 ml.), is added and the mixture is evaporated partially under reduced pressure. The resulting solid is filtered, well washed with water and dried. Crystallization of this solid with methylene chloride-ether gives 17β-acetoxy-7α,8-epoxy-17-[3′ - furyl] - estra - 1,3,5(10)-trien-3-ol, M.P. 190–192° C.

Similarly hydrolysis of the other 3,17β-diacetates of the 17α-substituted 7α,8-epoxyestra-1,3,5(10) - triene - 3,17-diols, obtained in Example 13 gives respectively:

17β-acetoxy-7α,8-epoxy-17-[2′-furyl]estra-1,3,5(10)-trien-3-ol,
17β-acetoxy-7α,8-epoxy-17-[2′-thienyl]estra-1,3,5(10)-trien-3-ol,
17β-acetoxy-7α,8-epoxy-17-[3′-thienyl]-estra-1,3,5(10)-trien-3-ol,
17β-acetoxy-7α,8-epoxy-17-methylestra-1,3,5(10)-trien-3-ol,
17β-acetoxy-7α,8-epoxy-17-ethylestra-1,3,5(10)-trien-3-ol,
17β-acetoxy-7α,8-epoxy-17-propylestra-1,3,5(10)-trien-3-ol,
17β-acetoxy-17-n-butyl-7α,8-epoxyestra-1,3,5(10)-trien-3-ol,
17β-acetoxy-7α,8-epoxy-17-vinylestra-1,3,5(10)-trien-3-ol, and
17β-acetoxy-7α,8-epoxy-17-ethinylestra-1,3,5(10)-trien-3-ol.

EXAMPLE 17

Chlorosulfonic acid (0.142 ml.), is added cautiously to ice-cold pyridine (1 ml.), followed by a solution of 17β-acetoxy-7α,8-epoxy-17-[3′-furyl]estra - 1,3,5(10) - triene-3-ol (200 ml.) in pyridine (2.6 ml.). The mixture is heated on a steam bath for 5 minutes following the complete dissolution of the solid. After cooling, water (30 ml.), is added, and the pH of the solution is adjusted to 6.5. A solution of quinidine sulfate (227 mg.), in water (227 ml.), is added slowly with stirring. The steroidal quinidine sulfate slowly precipitates. It is filtered, washed with water, and dried. To a solution of this salt (320 mg.), in methanol (2 ml.), a 10% methanolic solution of sodium hydroxide (0.23 ml.) is added. The liberated quinidine crystallizes. It is filtered, and washed well with a small volume of methanol. Addition of ether to the filtrate yields 17β-acetoxy-7α,8-epoxy - 17 - [3′ - furyl]estra-1,3,5(10)-trien-3-ol, 3-sodium sulfate, as an amorphous solid.

A solution of the above mentioned sodium sulfate (113 ml.), in 10% aqueous methanol (4.5 ml.), is refluxed for 20 minutes with sodium hydroxide (226 mg.). The cold solution is diluted with water (22.6 ml.) and the pH is adjusted to 6.5 by the addition of acetic acid. A solution of quinidine sulfate (102 mg.) in water (10.1 ml.) is added. The steroidal quinidine sulfate precipitates. It is filtered, well washed with water, and dried. The infrared spectrum of this salt shows the complete hydrolysis of the 17-acetate group. The steroidal quinidine salt is transformed as above, by treatment with methanolic sodium hydroxide, to 7α,8-epoxy-17α-[3′-furyl]estra-1,3,5(10)-triene-3,17-diol 3-sodium sulfate.

By a similar procedure the 17β-acetates of the other 17α-substituted-7α,8-epoxyestra-1,3,5(10)trien - 3 - ols are transformed into the 3-sodium sulfates of 7α,8-epoxy-17α-[2′-furyl]estra-1,3,5(10)-triene-3,17-diol,
7α,8-epoxy-17α-[2′-thienyl]estra-1,3,5(10)-triene-3,17-diol,
7α,8-epoxy-17α-[3′-thienyl]estra-1,3,5(10)-triene-3,17-diol,
7α,8-epoxy-17α-methylestra-1,3,5(10)-triene-3,17-diol,
7α,8-epoxy-17α-ethylestra-1,3,5(10)-triene-3,17-diol,
7α,8-epoxy-17α-propylestra-1,3,5(10)-triene-3,17-diol,
17-n-butyl-7α,8-epoxyestra-1,3,5(10)-triene-3,17-diol,
7α,8-epoxy-17α-vinylestra-1,3,5(10)-triene-3,17-diol, and
7α,8-epoxy-17α-ethinylestra-1,3,5(10)-triene-3,17-diol.

We claim:
1. 7α,8 - epoxy - 17α - [3′ - furyl] - estra - 1,3,5(10)-triene-3,17-diol.
2. 7α,8 - epoxy - 17α - [2′ - furyl] - estra - 1,3,5,(10)-triene-3,17-diol.
3. 7α,8 - epoxy - 17α - [2′ - thienyl] - estra - 1,3,5(10)-triene-3,17-diol.
4. 7α,8 - epoxy - 17α - ethinyl - estra - 1,3,5(10)-triene-3,17-diol.
5. 7α,8 - epoxy - 17α - [3′ - furyl] - 3 -methoxyestra-1,3,5(10)-trien-17-ol.
6. 7α,8 - epoxy - 17α - [2′ - furyl] - 3 - methoxyestra-1,3,5(10)-trien-17-ol.
7. 7α,8 - epoxy - 3 - methoxy - 17α - [2′ - thienyl]estra-1,3,5(10)-trien-17-ol.
8. 7α,8 - epoxy - 17α - ethinyl - 3 - methoxyestra-1,3,5(10)-trien-17-ol.
9. 17β - acetoxy - 7α,8 - epoxy - 17α - [3′ - furyl]-3-methoxyestra-1,3,5(10)-triene.
10. 17β - acetoxy - 7α,8 - epoxy - 17α - [2′ - furyl] - 3 - methoxyestra-1,3,5(10)-triene.
11. 17β - acetoxy - 7α,8 - epoxy - 17α - [2′ - thienyl]-3-methoxyestra-1,3,5(10)-triene.
12. 17β - acetoxy - 7α,8 - epoxy - 17α - ethinyl - 3-methoxyestra-1,3,5(10)-triene.
13. 3 - cyclopentyloxy - 7α,8 - epoxy - 17α - [3′ - furyl]-estra-1,3,5(10)-trien-17-ol.
14. 3 - cyclopentyloxy - 7α,8 - epoxy - 17α - [2′ - furyl]-estra-1,3,5(10)-trien-17-ol.
15. 3 - cyclopentyloxy - 7α,8 - epoxy - 17α - [2′ - thienyl]-estra-1,3,5(10)-trien-17-ol.

16. 3 - cyclopentyloxy - 7α,8 - epoxy - 17α - ethinylestra-1,3,5(10)-trien-17-ol.
17. 3 - acetoxy - 7α,8 - epoxy - 17α - [3' - furyl]estra-1,3,5(10)-trien-17-ol.
18. 3 - acetoxy - 7α,8 - epoxy - 17α - [2' - furyl]estra-1,3,5(10)-trien-17-ol.
19. 3 - acetoxy - 7α,8 - epoxy - 17α - [2' - thienyl]-estra-1,3,5(10)-trien-17-ol.
20. 3 - acetoxy - 7α,8 - epoxy - 17α - ethinylestra-1,3,5(10)-trien-17-ol.
21. 3,17β - diacetoxy - 7α,8 - epoxy - 17α - [3' - furyl]-estra-1,3,5(10)-triene.
22. 3,17β - diacetoxy - 7α,8 - epoxy - 17α - [2' - furyl]-estra-1,3,5(10)-triene.
23. 3,17β - diacetoxy - 7α,8 - epoxy - 17α - [2' thienyl]-estra-1,3,5(10)-triene.
24. 3,17β - diacetoxy - 7α,8 - epoxy - 17α - ethinylestra-1,3,5(10)-triene.
25. 7α,8 - epoxy - 17α - [3' - furyl]estra - 1,3,5(10)-triene-3,17-diol 3-sodium-sulfate.
26. 7α,8 - epoxy - 17α - [2' furyl]estra - 1,3,5(10)-triene-3,17-diol 3-sodium sulfate.
27. 7α,8 - epoxy - 17α - [2' - thienyl]estra - 1,3,5,(10)-triene-3,17-diol 3-sodium sulfate.
28. 7α,8 - epoxy - 17α - ethinylestra - 1,3,5(10) - triene-3,17-diol 3-sodium sulfate.

References Cited

UNITED STATES PATENTS 2,418,603   4/1947   Schwenk et al. ____ 260—397.4

ELBERT L. ROBERTS, Primary Examiner

U.S. Cl. X.R.

260—999